United States Patent
Marietta et al.

(10) Patent No.: US 9,229,884 B2
(45) Date of Patent: Jan. 5, 2016

(54) VIRTUALIZED INSTRUCTION EXTENSIONS FOR SYSTEM PARTITIONING

(75) Inventors: Bryan D. Marietta, Cedar Park, TX (US); Gary L. Whisenhunt, Leander, TX (US); Kumar K. Gala, Austin, TX (US); David B. Kramer, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 494 days.

(21) Appl. No.: 13/460,287

(22) Filed: Apr. 30, 2012

(65) Prior Publication Data

US 2013/0290585 A1    Oct. 31, 2013

(51) Int. Cl.
  *G06F 13/24*    (2006.01)
  *G06F 13/14*    (2006.01)

(52) U.S. Cl.
  CPC ..................... *G06F 13/14* (2013.01)

(58) Field of Classification Search
  CPC .................... G06F 11/0712; H04L 45/745
  USPC ............. 714/48, 49, 53; 370/389, 392, 395.2, 370/395.3; 710/262, 264, 266, 317
  See application file for complete search history.

(56) References Cited

U.S. PATENT DOCUMENTS

| | | | |
|---|---|---|---|
| 4,133,030 A | 1/1979 | Huettner et al. | |
| 5,193,187 A | 3/1993 | Strout et al. | |
| 5,600,805 A | 2/1997 | Fredericks et al. | |
| 5,659,756 A * | 8/1997 | Hefferon et al. | 710/200 |
| 6,598,069 B1 | 7/2003 | Rooney et al. | |
| 6,865,688 B2 | 3/2005 | Dawkins et al. | |
| 7,162,560 B2 * | 1/2007 | Taylor et al. | 710/266 |
| 7,209,994 B1 | 4/2007 | Klaiber et al. | |
| 7,272,664 B2 | 9/2007 | Arimilli et al. | |
| 7,296,133 B2 | 11/2007 | Swanberg | |
| 7,302,511 B2 | 11/2007 | Jeyasingh et al. | |
| 7,533,207 B2 * | 5/2009 | Traut et al. | 710/260 |
| 7,606,995 B2 * | 10/2009 | Herrell et al. | 712/13 |
| 7,617,340 B2 * | 11/2009 | Gregg | 710/62 |
| 7,660,912 B2 * | 2/2010 | Gregg | 710/5 |
| 7,689,747 B2 | 3/2010 | Vega et al. | |
| 7,752,378 B2 | 7/2010 | Fukumura et al. | |
| 7,818,751 B2 | 10/2010 | Togawa | |
| 7,835,356 B2 * | 11/2010 | Bar-Kovetz et al. | 370/389 |
| 7,849,247 B2 * | 12/2010 | Marietta et al. | 710/264 |
| 7,849,327 B2 | 12/2010 | Leung et al. | |
| 7,912,062 B2 * | 3/2011 | Gulati et al. | 370/392 |
| 7,987,464 B2 | 7/2011 | Day et al. | |

(Continued)

OTHER PUBLICATIONS

Freescale Semiconductor, Inc., EREF 2.0: A Programmer's Reference Manual for Freescale Power Architecture® Processors, Rev. 0, Sep. 2011.

*Primary Examiner* — Paul R Myers
(74) *Attorney, Agent, or Firm* — Terrile, Cannatti, Chambers & Holland, LLP; Michael Rocco Cannatti (57) ABSTRACT

A method and circuit for a data processing system provide virtualized instructions for accessing a partitioned device (e.g., 14, 61) by executing a control instruction (47, 48) to encode and store an access command (CMD) in a data payload with a hardware-inserted partition attribute (LPID) for storage to a command register (25) at a physical address (PA) retrieved from a special purpose register (46) so that the partitioned device (14, 61) can determine if the access command can be performed based on local access control information.

18 Claims, 4 Drawing Sheets

(56) References Cited

U.S. PATENT DOCUMENTS

| | | | |
|---|---|---|---|
| 8,041,920 B2* | 10/2011 | Konfaty et al. | 711/173 |
| 8,108,736 B2* | 1/2012 | Uchibori | 714/49 |
| 8,131,901 B2 | 3/2012 | Mansell et al. | |
| 8,175,271 B2* | 5/2012 | Belgaied et al. | 380/255 |
| 8,176,487 B2 | 5/2012 | Armstrong et al. | |
| 8,281,315 B2 | 10/2012 | Ault et al. | |
| 8,453,143 B2 | 5/2013 | Mahalingam et al. | |
| 8,489,789 B2 | 7/2013 | Serebrin et al. | |
| 8,560,782 B2* | 10/2013 | Marietta et al. | 711/153 |
| 8,589,934 B2 | 11/2013 | Makljenovic et al. | |
| 8,782,314 B2 | 7/2014 | Kothari et al. | |
| 2003/0061423 A1* | 3/2003 | Rankin et al. | 710/260 |
| 2003/0115443 A1 | 6/2003 | Cepulis et al. | |
| 2004/0205272 A1 | 10/2004 | Armstrong et al. | |
| 2004/0215860 A1 | 10/2004 | Armstrong et al. | |
| 2006/0212642 A1* | 9/2006 | Takahashi et al. | 710/317 |
| 2007/0208885 A1* | 9/2007 | Otsuka | 710/22 |
| 2008/0126652 A1 | 5/2008 | Vembu et al. | |
| 2008/0141277 A1 | 6/2008 | Traut et al. | |
| 2008/0162734 A1* | 7/2008 | Uehara et al. | 710/3 |
| 2008/0209182 A1 | 8/2008 | Snyder et al. | |
| 2008/0267193 A1* | 10/2008 | Fought et al. | 370/395.32 |
| 2008/0320194 A1 | 12/2008 | Vega et al. | |
| 2008/0320272 A1 | 12/2008 | Fukumura et al. | |
| 2009/0282211 A1* | 11/2009 | Hoover et al. | 711/173 |
| 2010/0095039 A1 | 4/2010 | Marietta et al. | |
| 2010/0146344 A1* | 6/2010 | Uchibori | 714/48 |
| 2011/0072220 A1 | 3/2011 | Marietta et al. | |
| 2012/0159245 A1 | 6/2012 | Brownlow | |
| 2013/0326102 A1* | 12/2013 | Marietta et al. | 710/262 |
| 2014/0047149 A1* | 2/2014 | Marietta et al. | 710/264 |
| 2014/0047150 A1* | 2/2014 | Marietta et al. | 710/264 |

* cited by examiner

VIRTUALIZED INSTRUCTION EXTENSIONS FOR SYSTEM PARTITIONING

BACKGROUND OF THE INVENTION

1. Field of the Invention

The present invention is directed in general to data processing systems. In one aspect, the present invention relates to system resource management in a data processing system that employs more than one partition.

2. Description of the Related Art

In data processing systems, the physical or hardware resources may be divided into resource subsets or logical partitions which virtually operate as a separate computer, where each partition typically contains a processor core and other specified resources or specified portions of a resource such as memory within the system. Existing partitioning strategies of replicating all the required hardware on a per-processor basis does not scale past a small number of multi-threaded processors because of the increased requirements for die area, wiring, and system memory, as well as the attendant system memory management issues. Partitioned systems also present challenges in determining, for a received access request, which partition, if any, is to respond to the access request. For example, when a request to access a system resource is received, access permission is typically determined based on attributes associated with the request, but the hardware and processing requirements associated with this process can be very significant.

Accordingly, a need exists for an improved system and methodology for managing system resources in a partitioned data processing system that address various problems in the art where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

A system, apparatus, and methodology are described for securely accessing a resource in a data processing system having plurality of partitions, each partition including one or more system resources. In order to securely access a resource in one of the partitions, an instruction set architecture is provided with a processor executable control instruction which performs a specialized store operation to a command register at the partitioned resource having a predetermined address under control of trusted software which encodes a data payload of the store operation with a hardware-inserted partition identifier (e.g., a Logical Partition Identifier, or LPID) and command to be completed by the partitioned resource. Upon executing the control instruction, the processor retrieves the predetermined address (e.g., a physical address) from a dedicated address register at the processor, where the retrieved address specifies the destination of the store operation, namely, the command register at the partitioned resource. In addition, the processor encodes the data payload of the store operation with the partition identifier and command values, thereby eliminating the need to convey this information as an attribute of the store operation. The predetermined address and partition identifier assigned to the resource access cannot be controlled by the requesting program, but are instead controlled by higher-level software which manages the system address map and partition identifiers. At the accessed resource, the partition identifier is used as a qualifier to determine if the requested access can be made based on local access control information. In an example embodiment, the accessed system resource is an interrupt controller which receives an access request from a processor when the processor executes the interrupt control instruction. Upon execution of the interrupt control instruction, the processor presents the access request to the interrupt controller as a specialized store operation which is written to a specified command register at the interrupt controller using a physical address controlled by the high-level software. The specialized store operation stores data at the command register which includes an interrupt identifier, a partition identifier associated with the access request, and an access command. The interrupt controller may then process the access request using the partition identifier to determine access permissions for the partition indicated by the partition identifier.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in simplified schematic diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 1:
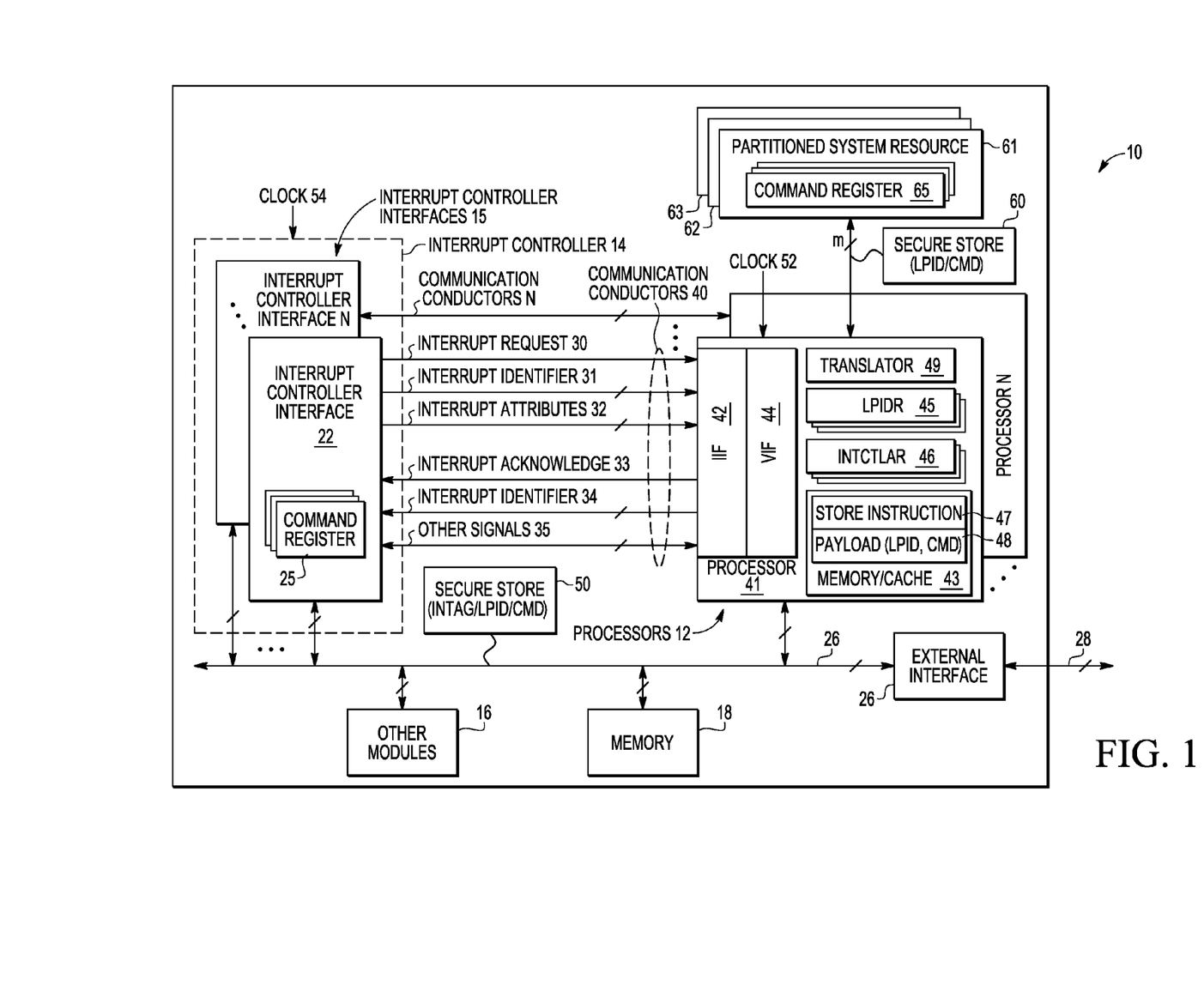
FIG. 1 is a simplified block diagram of a system for securely accessing partitioned resources with a partitioned instruction which encodes the data payload of a specialized store operation with an access command and hardware-inserted partition identifier in accordance with selected embodiments of the present invention.

To illustrate selected embodiments, reference is now made to FIG. 1 which depicts a simplified block diagram of a data processing system 10 for securely accessing partitioned resources 14, 61-63 with partitioned instructions which encode the data payload of a specialized store operation with an access command and a hardware-inserted partition identifier. The depicted data processing system 10 includes one of more processors 12 connected to an interrupt controller 14 over a plurality of communication conductors 40. In addition, an interconnect circuit or bus 26 provides a memory-mapped interface for connecting the processor(s) to the interrupt controller 14, one or more other modules 16, one or more memories 18, and external interfaces 24. Additional partitioned system resources 61-63 are also shown as being connected to the processor(s) 12, either directly over an m-bit bus 60 or indirectly over the bus 26 (not shown). Clock signals 54, 52 are provided, respectively, to the interrupt controller 14 and processor 41 which may have either an arbitrary phase and frequency relationship, or a known or predetermined relationship, with one another. Though illustrated as being formed on a single integrated circuit, the data processing system 10 may be provided on a plurality of integrated circuits.

In the data processing system 10, the processor(s) 12 include N processors (including processor 41 and processor N) that are directly connected over N communication conductors (including communication conductors 40) to N interrupt controller interfaces 15 (including interrupt controller interface 22) in the interrupt controller 14, where N is an integer greater than or equal to one. In embodiments where the processor N implements multithreading, each hardware thread having a thread private architecture state may be considered to be a virtual processor N. In selected embodiments, each of the N interrupt controller interfaces 15 is coupled to a corresponding one of the processors 12 by way of one or more communication conductors (e.g. communication conductor 40). In addition, both the processor(s) 12 and N interrupt controller interfaces 15 are bi-directionally coupled to the bus 26. As for the other modules 16, these may include any type of circuitry, such as, for example, timers, drivers, communication ports, etc. Similarly, memory 18 may include any type of memory, such as, for example, random access memory, read only memory, various types of non-volatile memory, etc. Finally, the external interfaces 24 connects the bus 26 to one or more external interrupt sources by way of one or more terminals or conductors 28.

The depicted communication conductors 40 include an interrupt request indicator 30, an interrupt identifier 31, and an interrupt attributes indicator 32 which are provided by the interrupt controller interface 22 to processor 41. In addition, the depicted communication conductors 40 include an interrupt acknowledge 33 and interrupt identifier 34. The communication conductors 40 may also include one or more other signals 35 which may be bidirectional, which may be uni-directional from interrupt controller interface 22 to processor 41, or which may be uni-directional from processor 41 to interrupt controller interface 22. As will be appreciated, the signaling information provided by conductors 30-32 may be provided by way of any one or more separate or shared conductors, and the information provided by conductors 33-34 may be provided by way of any one or more separate or shared conductors.

In operation, the interrupt controller 14 provides an interrupt request 30 along with a corresponding interrupt identifier 31 and corresponding interrupt attributes 32 to a processor 41. Sorting circuitry (not shown) at the interrupt controller 14 sorts the pending interrupt requests for a particular target processor so that only the top or highest priority interrupt request 30 is presented or asserted to the target processor. Upon accepting the interrupt, the processor 41 returns an interrupt acknowledge 33 to the interrupt controller 14, along with the same interrupt identifier 34. In addition, the processor typically issues one or more additional access requests relating to the accepted interrupt (e.g., end-of-interrupt commands) which must be handled by the interrupt controller 14. While additional interrupt-related access requests by the processor 41 could be conveyed directly to the interrupt controller 14 over conductors 33-35, such sideband communications present challenges with maintaining transaction ordering unless they are handled by additional, more expensive, methods. However, sideband communication paths can be used with other types of system resources.

To support virtualized interrupt processing, the processor 41 includes an interrupt interface (IIF) 42 whereby a global interrupt controller (interrupt controller 14) communicates with the (virtual) processor 41. In addition, a virtualized interface (VIF) 44 is provided as a hardware and/or software interface between the (virtual) processor and IIF 42. The interrupt interface 42 coordinates interrupt processing between the (virtual) processor 41 and the interrupt controller 14. With this arrangement, when the interrupt controller 14 sends the highest priority interrupt for a (virtual) processor, the VIF 44 conveys the interrupt to the (virtual) processor which decides whether to take the interrupt. With virtualized interrupts, the processor 41 can begin servicing the interrupt without having to perform memory mapped operations (e.g., over the interconnect circuit or bus 26) to the interrupt controller 14, thereby reducing overhead and latency. Interrupt virtualization also allows interrupts to be targeted to the guest OS currently in execution, the hypervisor, or any guest OSes currently bound to the (virtual) processor which are not currently in execution.

In order to securely process virtualized interrupt requests, the instruction set architecture for the processor 41 includes a special processor executable instruction which includes an instruction identifier portion 47 and data payload portion 48 that may be retrieved from memory (e.g., memory 18) or local processor storage 43 (e.g., cache memory, EEPROM, flash memory, ROM, MRAM, etc.). The processor 41 uses the control instruction 47-48 to handle one or more states for the virtualized interrupts to perform normal runtime interrupt management (e.g., standard run-time operations associated with interrupts for hypervisors, guests in execution, and guests not in execution) with minimal memory mapped interactions with a global interrupt controller, reducing overhead and latency. For example, a received interrupt request has certain information associated with it at the processor(s) 41 and interrupt controller 14 which may be defined by software during configuration of interrupts and, or by the hardware and used to process the interrupt request. The associated information may include a hypervisor configured logical partition ID (LPID) value associated with the interrupt that is conveyed with the interrupt identifier 31. At the processor 41, the LPID received with the interrupt is compared to the LPIDR register 45 to determine whether this is a hypervisor interrupt, a guest in execution interrupt, or a guest not in execution interrupt.

The LPID may also be used to convey access commands to the partitioned resource (e.g., interrupt controller 14) when the processor executable control instruction 47-48 is executed by the processor 41 to perform a specialized store operation to a predetermined address at the interrupt controller 14 to thereby store a hardware-inserted LPID value and associated command (CMD) to be performed by the interrupt controller 14. To secure the partitioned access request, the execution of the instruction 47-48 is managed by trusted software which uses values stored in dedicated registers at the processor 41. In particular, the processor 41 retrieves the LPID value from the LPIDR register 45 and encodes the retrieved LPID value—along with a command value (CMD)—into the data payload of the store operation. An interrupt identifier or tag associated with the interrupt (e.g., INTTAG) may also be retrieved from a special purpose register (not shown) and encoded in the data payload under control of the control instruction 47-48 for use in uniquely identifying the targeted interrupt in the interrupt controller 14. In addition, the processor retrieves from the interrupt control address (INTCTLAR) register 46 the real or physical address of the command register for the store operation specified by the interrupt control instruction 47-48. Finally, the processor completes the execution of the interrupt control instruction 47-48 by performing a secure store operation 50 to the command register 25 of the interrupt controller 14 using the physical address stored in the interrupt control address (INTCTLAR) register 46, where the store operation stores a data payload which includes the LPID value and the associated command (CMD). By controlling access to the special purpose registers (SPRs) 45-46 with trusted higher-level software (e.g., the hypervisor), the physical address and LPID assigned to the access are prevented from being controlled by a requesting program.

With the processor executable interrupt control instruction, access requests to a partitioned interrupt controller are efficiently conveyed by performing a specialized store operation to a command register at the partitioned interrupt controller in a protected partition-based manner. With the interrupt control instruction, a data payload of the store operation is encoded with a hardware-inserted partition identifier (e.g., a Logical Partition Identifier, or LPID) and an access command to be completed by the interrupt controller at a predetermined address, where the address is stored in a dedicated address register or otherwise derived by the hypervisor. In this way, the interrupt control instruction (INTCTL) is executed to identify and control CPU accesses to the interrupt controller 14 by encoding the data payload with a partition attribute (e.g., LPID) that is retrieved from the LPIDR 45, and then storing the data payload as a secure store operation 50 over the bus 26 to a specified address for the command register 25 that is stored in the interrupt control address register (INTCTLAR) 46 by the hypervisor. In addition, the data payload may be encoded with any desired interrupt controller command to perform operations in the interrupt controller 14 in a virtualized and partitioned manner. For example, the interrupt control instruction allows software (both guest and hypervisor) to encode LPID and command values to denote that interrupt processing has completed for an interrupt (e.g., an EOI notification), thereby changing the interrupt state from "in-service" to "idle." In other embodiments, the interrupt control instruction allows software to encode LPID and command values which defer an identified interrupt, thereby changing the interrupt state to "deferred." The interrupt control instruction also allows software to encode LPID and command values to activate an interrupt, thereby changing the interrupt state from "deferred" to "idle." In addition, the hypervisor can use the interrupt control instruction to "defer all" interrupts associated with a (virtual) processor and an LPID value based on priority level, and to "activate all" interrupts associated with a (virtual) processor and an LPID value that were previously deferred. As will be appreciated, these are example interrupt states, and an interrupt can be transferred to other states (e.g., "suspended-in-service," "suspended-deferred," and "suspended," etc.) by the interrupt control instruction. In operation, the interrupt control instruction causes the processor 41 to perform a store to the real address of the command register 25 at the resource associated with the (virtual) processor (e.g., interrupt controller 14). Using the real address stored in the INTCTLAR 46, the interrupt control instruction takes the data specified by the contents of a specified source register, merges in the LPID value from the LPIDR register 45 and masks off certain commands based on guest or hypervisor state before writing the result to the command register 25 identified by the real address stored in the INTCTLAR 46. By making the LPIDR 45 and INTCTLAR 46 hypervisor-privileged registers, the LPID and physical address, and to some extent the command assigned to the access, cannot be controlled by the requesting program. The ability of the interrupt control instruction to implement hardware masking of a command bit provides an enforcement mechanism for selected hypervisor-only commands (e.g., the "defer all" and "activate all" commands).

In addition to specifying information for access requests to the interrupt controller 14, the SPRs 45-46 may also be used to process requests received from the interrupt controller 14. For example, when the LPID value associated with the requested interrupt 30 is equal to the contents of the LPIDR register 45, the processor 41 takes the interrupt as a guest OS interrupt for the current partition in execution. But in cases where the LPID value associated with the interrupt is not equal to the contents of the LPIDR register 45, the requested interrupt 30 is processed as a guest OS interrupt for a partition that is bound to the (virtual) processor 41, but that is not in execution. In addition, the requested interrupt 30 may be a hypervisor interrupt which is not associated directly with a partition.

Once the processing of the requested interrupt is completed, the (virtual) processor 41 may execute the interrupt control instruction 47-48 to perform an EOI (end-of-interrupt) operation on the interrupt. The EOI operation is executed by encoding the data payload of the specialized store operation with the interrupt tag, LPID value, and an EOI command. The data payload is then written as a memory-mapped secure store operation 50 over the bus 26 to the command register 25 specified by the address contained in the interrupt control address (INTCTLAR) register 46. With this approach, EOI operations on interrupts are not required to be stacked since they are tagged, thereby eliminating the need for synchronization between the act of taking an interrupt and performing the EOI operation on another interrupt which exists. The interrupt controller 14 uses the partition attribute (LPID) to determine if operation is allowed based on its local access control information.

Figure 2:
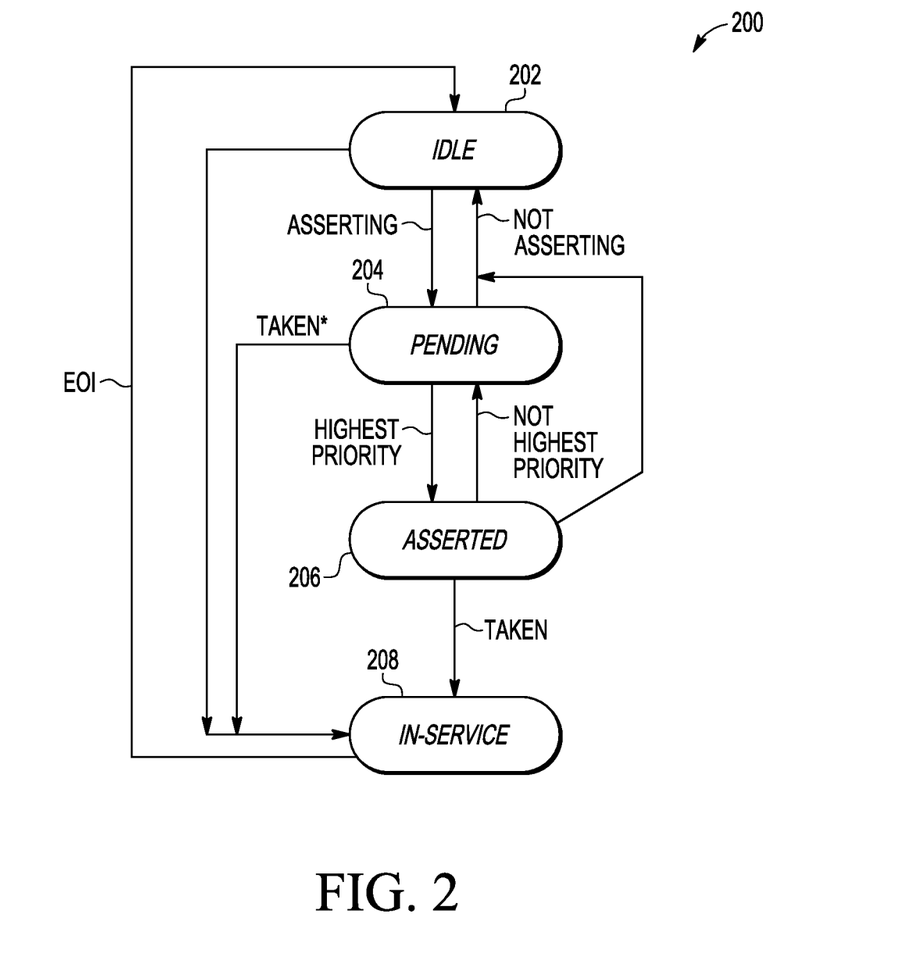
FIG. 2 is a state diagram illustrating the handling of an interrupt request in accordance with selected embodiments of the present invention.

To illustrate how the interrupt control instruction may be used to handle interrupt requests, reference is now made to FIG. 2 which shows a state diagram illustrating the handling of an interrupt request. In an initial "idle" state 202, the interrupt is idle and is not currently asserting. Once the source of an interrupt has requested an interrupt, the interrupt moves to the "pending" state 204 over the "asserting" transition. In the "pending" state 204, the interrupt is processed at the global interrupt controller and contends with all other interrupts bound to the same (virtual) processor to be selected as the highest priority interrupt. Conversely, once the interrupt is no longer asserting (e.g., when the source of the interrupt has withdrawn its request for an interrupt), the interrupt state returns to the "idle" state 202 over the "not asserting" transition.

If the interrupt has the highest priority, it moves to the "asserted" state 206 over the "highest priority" transition. At the "asserted" state 206, the interrupt is sent from the global interrupt controller to the processor as the current highest priority interrupt. Conversely, once the interrupt is no longer the highest priority asserting interrupt at the (virtual) processor, the interrupt state returns to the "pending" state 204 over the "not highest priority" transition. If the interrupt is no longer asserting because the interrupt request was withdrawn, the interrupt state returns to the "idle" state 202 over the "not asserting" transition.

Once the processor takes the interrupt, the interrupt enters the "in-service" state 208 over the "taken" transition. During the "in-service" stage, the processor begins executing the external interrupt, and information about the interrupt is used to determine whether the interrupt is taken in the guest state or the hypervisor state. At this point, the processor may update one or more special purpose registers with tag and attribute information for the interrupt.

When the execution of the interrupt is completed, an end-of-interrupt command may be performed when the processor executes an interrupt control instruction to write the EOI command with the associated interrupt tag and LPID value to the interrupt command register 25 of the interrupt controller 14. As a result, the interrupt returns to the "idle" state 202 from the "in-service" state 208 over the end-of-interrupt "eoi" transition.

Figure 3:
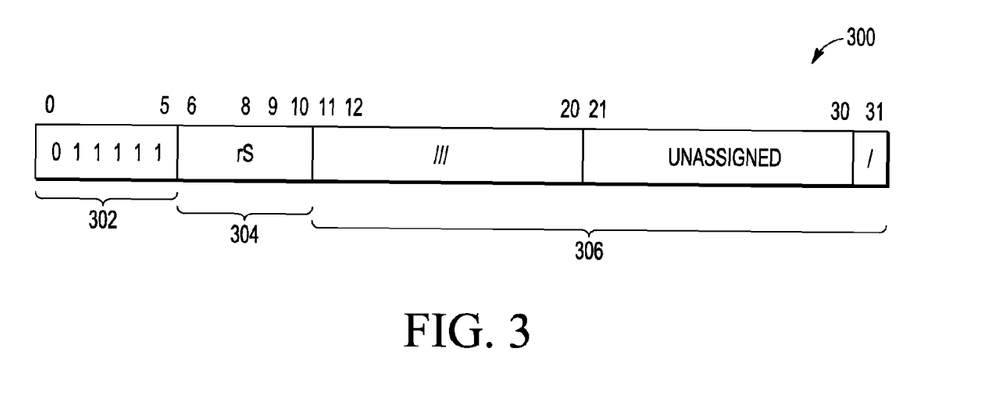
FIG. 3 depicts selected fields of an interrupt control instruction in accordance with selected embodiments of the present invention.
Figure 4:
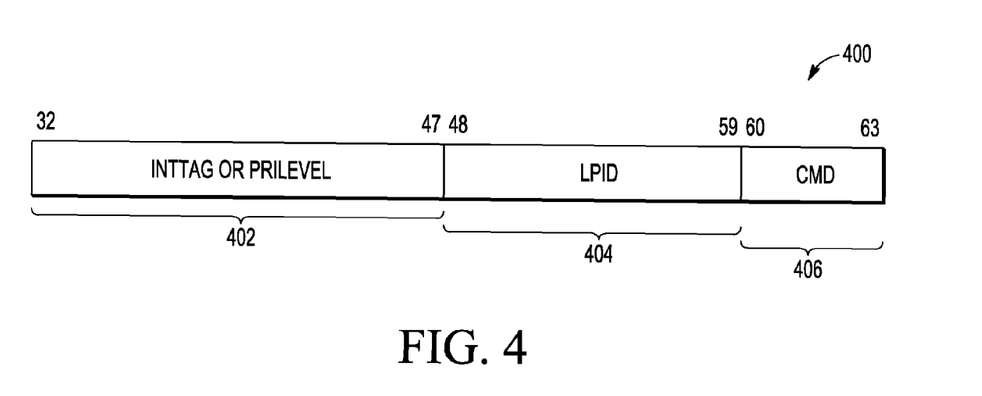
FIG. 4 depicts data format fields of an interrupt control instruction in accordance with selected embodiments of the present invention.

To provide an example definition of an interrupt control instruction 47-48, reference is now made to FIGS. 3-4 which depict selected instruction identifier fields 300 and data payload fields 400 of an interrupt control instruction. While it will be appreciated that any desired instruction identifier and data payload fields may be used to uniquely identify the interrupt control instruction, FIG. 3 shows an example set of instruction identifier fields 300 including a first bit field 302 (e.g., bits 0-5) which specifies an interrupt control instruction identifier, a second bit field 304 (e.g., bits 6-10) which specifies the source register (rS), and a third bit field 306 (e.g., bits 11-31) which has no assigned functionality. Likewise, FIG. 4 shows an example set of data payload fields 400, including a first bit field 402 (e.g., bits 0-47) which specifies device-specific information for the partitioned resource (e.g., an interrupt identifier or priority level value), a second bit field 404 (e.g. bits 48-59) which specifies a partition identifier for the interrupt (e.g., LPID), and a third bit field 406 (e.g., bits 60-63) which specifies a command value for the interrupt. When the interrupt control instruction 300, 400 is executed, the processor 41 identifies the interrupt control instruction based on the instruction identifier fields 300, and then provides a portal to perform word stores of the data payload fields 400 to the real address obtained from the INTCTLAR register, as illustrated with the example pseudocode set forth below:

```
raddr <-- INTCTLAR
if MSRGS = 0 then    // if executed by hypervisor
    data <-- (rS)_{32:63}
else
    data <-- (rS)_{32:47} || LPIDR_{52:63} || (rS)_{60:62} || 0b0
REAL_MEM(raddr, 4) <-- data.
```

With the depicted pseudocode, a data store operation to the interrupt controller 14 is specified for storing the encoded data payload (data) as four bytes of information at the real address (raddr) using the store operation (REAL_MEM). If the interrupt control instruction is executed in the hypervisor state (e.g., MSRGS=0b0), then the word stored at address (raddr) can be any data encoded into the data payload (data) that specified by the hypervisor (e.g., bits 32:63 of the source register rS). However, if the interrupt control instruction is executed in the guest supervisor state, (e.g., MSRGS=0b1), then the encoded data payload word (data) stored at address (raddr) is a predetermined concatenation of device-specific information 402, partition identification information 404, and command information 406. In an example embodiment, the device-specific information 402 is encoded with the upper 16 bits of the lower word of rS to convey an interrupt identifier (e.g., INTTAG) or interrupt priority level (PRILEVEL). In addition, the partition identification information 404 is encoded with the LPID copied from the LPIDR. Finally, the command information 406 is encoded with bits 60:62 of rS (identifying the command) and one "0" bit (indicating if this is a hypervisor command). When in the guest supervisor state, the low order bit from the third CMD field 406 is cleared so that the low order bit for the CMD field is reserved for hypervisor-only commands. As a result, the operating systems should not use commands which have the low order bit set even in bare metal execution as these commands are reserved for specific hypervisor actions and not available when the operating system is executing as a guest. Other bits of the third CMD field 406 may be used to specify different operations to be performed by the operating systems and hypervisors. For example, if CMD=0000, this may specify an end-of-interrupt (EOI) command so that the interrupt identified by the associated INTTAG and qualified against the LPID value is taken out of service and its state in the interrupt controller goes to "idle." Performing an EOI command to an interrupt that is not in the in-service state or does not pass the LPID qualification check is ignored by the interrupt controller. If the supplied LPID is 0 (or any other predetermined value indicating the hypervisor), the LPID match is ignored and only the INTTAG compare is used.

Though FIGS. 1-4 describe selected interrupt controller embodiments, the virtualized instruction scheme disclosed herein can also be used more generically as a virtualized device control instruction (e.g., DEVCTL) which supports secure accesses to other partitioned resources or devices. In FIG. 1, this is shown with reference to one or more partitioned system resources 61-63 which may be accessed by executing a device control instruction at the processor which encodes a partition identifier value (e.g., LPID) along with other device-specific information into the data payload of a secure store operation 60 which is written to a predetermined command register location at the resource over any desired interface. For example, the secure store operation 60 is shown as being conveyed over a direct connection interface, but can also be communicated over the memory mapped interconnect circuit or bus 26 in order to maintain transaction ordering requirements. At a first system resource 61, the secure store operation 60 may be received as a memory write operation which stores a partition identifier (LPID) and command (CMD) at a specified address for the command register 65.

To support secure data stores to predetermined storage addresses at different devices, the processor may include a translator circuit or module 49 for converting a device identifier to a corresponding storage address. In different embodiments, the translator 49 may be used to support different partitioned devices 61-63 based on addresses or device ID indexing to provide a partition identifier and physical address for the storage location at the targeted device. In the address form, the translator 49 acts as a translation lookaside buffer (TLB) that maps small address ranges and encodes the partition identifier (LPID) from the matching TLB entry into the data payload of the secure store operation 60. In the indexing form, the translator 49 uses a register or other lookup table (e.g., content addressable memory) in which an identifier for the target device is used to look up the physical address for the storage location at the targeted device.

To securely and efficiently convey partitioned commands to different devices 61-63, a device control instruction (e.g., DEVCTL) may be defined which includes predetermined instruction identifier fields and data payload fields which are encoded with the contents of selected operands. As with the interrupt control instruction described hereinabove, any desired instruction identifier and data payload fields may be used to uniquely identify the device control instruction which, when executed by the processor, provides a portal to perform word stores of the data payload fields to a predetermined address at the target device. In an example embodiment, the device control instruction includes two operands, rA and rB. The first operand (rA) contains the device identifier (device ID) for the partitioned device/resource being accessed, while the second operand (rB) contains the access operation and any specific data which is to be transmitted to that device. Both operands are general purpose registers (not shown) in which software can construct any data value. The registers rA, rB are also sized to hold at least predetermined device specific information, a command value, and a partition identifier value for encoding as part of the data payload store operation to a targeted resource (e.g., 61). For example, if the registers rA, rB each hold 64 bits, the device control instruction may be executed to send the predetermined device specific information, command value, and partition identifier value in a 32 bit secure storage operation 60 to the targeted device (as if it was a 32-bit store operation to a memory address). Software (running as a guest) will construct the values to go into rA and rB depending on what device they wish to send commands to and what operation they want to perform on the device.

When the device control instruction is executed to access a system resource having a device identifier (deviceID), the processor 41 performs a secure store operation 60 of data payload fields (data) to a specified address (raddr) at the targeted system resource. An example sequence of pseudocode for the operation of the device control instruction is set forth below:

```
Set deviceID to the contents of register rA;
Look in device table for entry which is valid and assigned to deviceID;
if no matching entry found in the device table then
Generate an interrupt to the hypervisor;
// error, hypervisor updates table or disallows.
else                          // found a matching entry in the device table
Set raddr to the address associated with the device table entry that
matched;
if currently executing as trusted software (hypervisor) then
Set data to the contents of  // hypervisor encodes data with contents of
register rB;                  // register rB
else                          // guest supervisor state
Clear least significant bit of data;
Encode the logical partition identifier and command into the data at
predetermined bit positions by copying the contents of the LPIDR register;
                              // guest securely encodes data with partition
                              // ID and command
write data to raddr;          // write data to register raddr at deviceID.
```

With the depicted pseudocode, the variables "deviceID," "data," and "raddr" may each be 32-bits in length. In addition, the processor may implement the translator circuitry 29 with a table ("device table") which contains two fields for each entry, including a first field containing a device identifier (deviceID) and a second field containing a real address for a storage location in that device where the encoded device specific information, LPID, and commands should be stored. Trusted software (the hypervisor) populates this table with the device identifiers and their respective addresses.

In executing the depicted pseudocode, the processor stores the device identifier (deviceID) for the targeted device in a first operand register rA, and then looks for a matching entry in the device table. If there is no matching device ID entry in the device table, then an error is indicated to the trusted software which can disallow the requested access, emulate the effects of this instruction by performing the actions that would have been done by the instruction, or update the device table to replace one of the entries in the device table with an entry that contains deviceID and its associated command address and then return to let the guest re-execute the instruction which will then be able to operate correctly.

On the other hand, if a matching device ID entry is found in the device table, then the associated address from the device table is set as the address (raddr). At this point, if the device control instruction is executed in the hypervisor state, then the contents of a second operand register (rB) are encoded into the data field (data). But if the device control instruction is executed in the guest supervisor state, then the logical partition identifier (e.g., LPID) and specified command operation (CMD) are securely encoded in the data field (data) along with a "0" bit in the low order bit position, thereby reserving the low order bit for hypervisor only commands. In other words, the least significant bit is cleared to indicate that the command is sent by the guest, and is set to indicate that the command is sent by the hypervisor.

To ensure secure encoding, the processor retrieves the logical partition identifier (LPID) from a special purpose LPID register (LPIDR) where the trusted software keeps the logical partition identifier of the currently running guest. The retrieved LPID value and associated command values are then encoded into predetermined bit positions (e.g., bit positions 48 through 59) of the data field, where the number and placement of encoded data bits holding the logical partition identifier and command may be arbitrarily selected by the trusted software. Additional information, such as device specific information, may also be encoded in the data field.

Finally, the encoded data field is written to the targeted device using the specified address (raddr) to thereby securely transfer the encoded partition identifier and associated command for use by the targeted device to ensure that the command operation is properly processed. In selected embodiments, the transferred data is a 32-bit secure store operation to the command register 65 identified by the specified address (raddr) retrieved from the translator circuitry 49.

Figure 5:
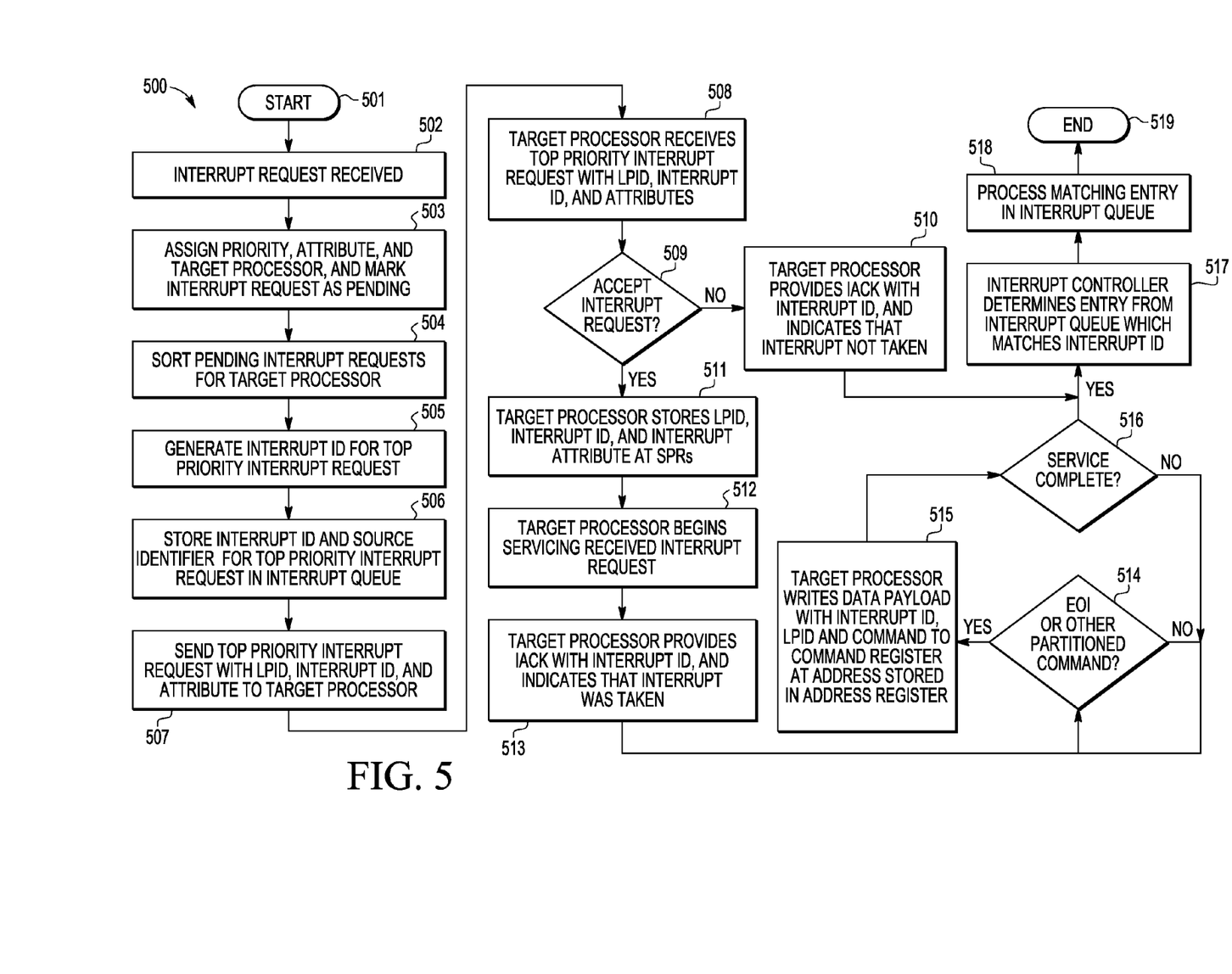
FIG. 5 depicts an example flow diagram according to a method for accessing partitioned resources in accordance with selected embodiments of the present invention.

Referring now to FIG. 5, there is depicted an example flow diagram 500 of a method for accessing partitioned resources in accordance with selected interrupt controller embodiments of the present invention. Once the method starts at step 501, an interrupt request is received at step 502. The interrupt request may be received from one or more interrupt sources coupled to an interrupt controller 14, where the interrupt sources may be internal or external to the data processing system 10.

At step 503, the interrupt controller responds to a received interrupt request by assigning virtualized interrupt information to the interrupt request and marking the interrupt request state as "pending." The assigned information may include an interrupt priority value, various interrupt attributes, and interrupt source identifier, along with the target processor and any state information associated with the interrupt request. As will be appreciated, each interrupt source may be assigned a corresponding priority, attributes, partition, and target processor, though different interrupt sources may share a same priority, attributes, partition, and/or target processor (which refers to the processor that is intended to service the interrupt). The state information may include one or more indicators to indicate various states of the interrupt (e.g., pending, asserted, in service, invalid, etc.). In addition, partition information (e.g., LPID) is assigned or associated with each interrupt request.

At step 504, the pending interrupt requests for each target processor are sorted. The interrupt controller may include sorting circuitry for determining which processor is the target processor for the interrupt request and sorting the interrupt requests for each target processor. The interrupt requests may be sorted by way of priority, age, interrupt type, etc., or any combination thereof. Once a top interrupt request has been determined, an interrupt identifier, or ID, corresponding to that particular interrupt is generated at step 505. The interrupt identifier or tag may be generated in any desired manner, and can be any value that uniquely identifies the interrupt request. Once the interrupt associated with a corresponding interrupt identifier has been serviced, the value of that interrupt identifier can be used again for a new and completely unrelated interrupt, if desired. The value of the interrupt identifier may have a particular significance (e.g. interrupt source number, etc.) or may be unrelated to the interrupt itself.

At step 506, the interrupt ID for the top priority interrupt request is sent to an outstanding interrupt request queue or similar structure to be remembered along with the interrupt source identifier. In addition, the top priority interrupt request is sent to the target processor at step 507, along with the associated partition ID (LPID), interrupt ID, and interrupt attributes. In the example shown in FIG. 1, the interrupt controller 14 provides the top priority interrupt request through the interrupt request 30, the interrupt identifier 31, and interrupt attributes 32 to processor 41. Other embodiments may provide this information using any desired and appropriate signaling scheme (e.g., some of this information may be provided serially, in parallel, may be time multiplexed, etc.).

Once an interrupt request and associated LPID, interrupt ID, and attributes are received at the target processor (step 508), the processor determines whether or not to accept the received interrupt request at decision step 509. Any desired criteria may be used to determine whether or not to accept the received interrupt request. For example, software and/or hardware masking of interrupts may be used in processor. In addition or in the alternative, the decision to accept or reject an interrupt may be deferred or suspended until there is a change in one or more mask values to allow acceptance of the interrupt, or until a new interrupt request is received. If an original interrupt request has not yet been accepted when a new interrupt request is received, then the processor will reject the original interrupt request in favor of the new interrupt request since a new interrupt request will only be sent to the processor if that new interrupt request was determined by sorting circuitry to be of higher priority.

If the interrupt request is not accepted (negative outcome to decision 509), the target processor provides an interrupt acknowledge (IACK) message and an interrupt identifier to the interrupt controller to indicate that the requested interrupt was not taken at step 510. At the interrupt controller, the interrupt identifier may be used to identify the matching entry in the outstanding interrupt request queue (step 517) and then remove the matching entry from the queue (step 518) before the sequence ends (at step 519). At this point, the interrupt has been delivered to target processor, the target processor is not servicing the interrupt, and the interrupt remains in the "pending" state in the interrupt controller so that it can again be selected for presentation to the processor.

If the interrupt request is accepted by the target processor (affirmative outcome to decision 509), the target processor stores the partition ID (LPID), interrupt ID, and interrupt attributes in memory (e.g., special purpose registers) for further processing at step 511. In particular, the received partition ID (LPID) may be stored and compared with the LPID value stored in LPID register (LPIDR) for purposes of steering the interrupt request to the guest or hypervisor, and the interrupt ID and interrupt attributes may be stored for use in processing the interrupt request. At step 512, the target processor begins servicing the received interrupt request. As will be appreciated, the servicing of an interrupt request may be performed in any desired and appropriate manner.

As an initial step 513 in the interrupt servicing, the target processor provides an interrupt acknowledge (IACK) and an interrupt identifier, and asserts an interrupt taken/not taken indicator to indicate that the interrupt was taken. The interrupt controller uses the interrupt identifier to select the corresponding entry in the outstanding interrupt request queue and then updates the state information for the corresponding interrupt source identifier to change the state of the interrupt request from the "pending" to the "in-service" state.

During servicing of the interrupt request, the target processor may issue a partitioned command to the interrupt controller by executing an interrupt control instruction which performs a specialized store of the partitioned command, such as an EOI (end-of-interrupt) instruction. At a minimum, an EOI command is generated when the target processor completes servicing of the requested interrupt. Once the control instruction for the partitioned command is executed (affirmative outcome to decision 514), the target processor writes the partitioned command and associated LPID (and any interrupt ID) to the data payload which is securely stored to an interrupt controller command register having an address which is stored in a dedicated address register at step 515. As described herein, the interrupt controller uses the received LPID to qualify any received command against the configured LPID for the identified interrupt.

For so long as the interrupt is active and being serviced (negative outcome to decision 516), the target processor may issue any partitioned command (step 514) as an encoded data payload store to the interrupt controller (step 515). However, once the target processor completes servicing of the interrupt (positive outcome to decision 516), the partitioned EOI indication sent to the interrupt controller is processed by using the interrupt identifier to identify the matching entry in the outstanding interrupt request queue (step 517) and then remove the matching entry from the queue (step 518) before the sequence ends (at step 519). At this point, the interrupt has been delivered to target processor with its corresponding interrupt ID, attributes, and LPID. And depending on the partition command, the target processor is servicing the interrupt (in which case the interrupt is in the "in-service" state at the interrupt controller) or the interrupt is otherwise being processed in another state.

As will be appreciated, the virtualized control instruction and associated device control circuits and methods provide a secure and efficient mechanism for managing system resources in a partitioned/virtualized machine. In selected embodiments, the device control circuitry may be embodied in hardware, in processing circuitry for executing software (e.g., including but is not limited to firmware, resident software, microcode, etc.), or in some combination thereof. Furthermore, the device control circuitry may be embodied as a computer program product accessible from a computer-usable or computer-readable medium providing program code for use by or in connection with a computer or any instruction execution system, where a computer-usable or computer readable medium can be any apparatus that may include or store the program for use by or in connection with the instruction execution system, apparatus, or device. Examples of a non-transitory computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD. In addition, the non-transitory computer readable storage medium described herein may store a first device control instruction which, upon execution, causes the processor to access a partitioned resource by performing a non-exclusive sequence of actions. The device control circuitry described herein may be part of the design for an integrated circuit chip which controls the fabrication of chips or the photolithographic masks used to fabricate chips by defining design rules for fabricating integrated circuit chips from a semiconductor wafer into final packaged form.

By now it should be appreciated that there has been provided a circuit, method and system for managing a resource in a partitioned computer system. In selected embodiments, resource management is enabled by providing an instruction set architecture (ISA) with at least a first device control instruction stored in a computer readable storage medium and executed by at least a first processor to access a partitioned resource. Upon executing the first device control instruction, an access command is generated for the partitioned resource. In addition, a partition parameter for the access command is retrieved from a first hardware register which may have its write access restricted to trusted higher-level software. Execution of the first device control instruction also generates a storage address for a predetermined storage location at the partitioned resource. In selected embodiments, the storage address is retrieved from a second hardware register which may have its write access restricted to trusted higher-level software. In other embodiments, the storage address is generated by accessing a device table with a device identifier for the partitioned resource to retrieve the storage address, where write access to the device table may be restricted to trusted higher-level software. Finally, the access command and partition parameter are encoded into a data payload which is written or stored to the predetermined storage location (e.g., a specified command register) at the partitioned resource using the storage address. The data payload may also be encoded by setting a predetermined bit therein to a value which indicates whether the access command is generated by trusted higher-level software or by a guest supervisor. The storage of the data payload may be implemented by using a memory-mapped secure store operation. In selected embodiments, the executed first device control instruction causes the processor to access a partitioned interrupt controller with an access command (e.g., an EOI command to take an identified interrupt request out of service to an idle state), though other partitioned devices may be accessed.

In another form, there is provided a method and apparatus for managing a resource in a partitioned computer system. In the disclosed methodology and apparatus, a processor generates a command for a resource, such as a partitioned interrupt controller which receives and prioritizes partitioned interrupt requests from one or more interrupt sources to deliver a top priority interrupt to a processor, though other partitioned devices may be accessed. The processor then retrieves a partition parameter (e.g., LPID) from a first hardware register which may have its write access restricted to trusted higher-level software. The processor also generates a storage address for a predetermined storage location at the resource. In selected embodiments, the storage address is retrieved from a dedicated address register which may have its write access restricted to trusted higher-level software. Finally, the processor encodes the command and partition identifier into a data payload which is stored or written to the predetermined storage location at the resource using the storage address using a memory-mapped secure store operation.

In yet another form, there is provided a method and apparatus for processing information in a data processing system having a processor and a partitioned resource. In operation, a resource control instruction is executed to perform a secure store operation of a data payload to a dedicated storage address at the partitioned resource, where the data payload includes an access command and associated hardware-inserted logical partition identifier (LPID). At the partitioned resource, the logical partition identifier (LPID) is used as a qualifier to determine if the access command can be performed based on local access control information. To promote secure access, the dedicated storage address and logical partition identifier (LPID) are managed by trusted software.

Although the described exemplary embodiments disclosed herein are directed to methods and systems for managing system resources in a partitioned/virtualized machine using virtualized instructions, the present invention is not necessarily limited to the example embodiments illustrate herein, and various embodiments of the device control circuitry and methods disclosed herein may be implemented with other circuit components. For example, other command instructions with different partitioned commands for devices other than interrupt controllers may be used. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "by," "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A non-transitory computer readable storage medium comprising a first device control instruction of an instruction set architecture, which when executed on a processor, causes the processor to access a partitioned interrupt controller by:
   generating an access command for the partitioned interrupt controller;
   retrieving a partition parameter for the access command from a first hardware register;

generating a storage address for a predetermined storage location at the partitioned interrupt controller;
encoding the access command and partition parameter into a data payload; and
writing the data payload to the predetermined storage location at the partitioned interrupt controller using the storage address.

2. The computer readable storage medium of claim 1, where the first device control instruction causes the processor to generate the access command by generating an end-of-instruction (EOI) command to the interrupt controller to take an identified interrupt request out of service to an idle state.

3. The computer readable storage medium of claim 1, where write access to the first hardware register is restricted to trusted higher-level software.

4. The computer readable storage medium of claim 1, where the first device control instruction causes the processor to generate the storage address by retrieving the storage address from a second hardware register.

5. The computer readable storage medium of claim 4, where write access to the second hardware register is restricted to trusted higher-level software.

6. The computer readable storage medium of claim 1, where the first device control instruction causes the processor to generate the storage address by accessing a device table with a device identifier for the partitioned interrupt controller to retrieve the storage address.

7. The computer readable storage medium of claim 6, where write access to the device table is restricted to trusted higher-level software.

8. The computer readable storage medium of claim 1, where the first device control instruction causes the processor to write the data payload to a command register at the partitioned interrupt controller using the storage address.

9. The computer readable storage medium of claim 1, where the first device control instruction causes the processor to write the data payload to the predetermined storage location using a memory-mapped secure store operation.

10. The computer readable storage medium of claim 1, where the first device control instruction causes the processor to encode the data payload by setting a predetermined bit in the data payload to a first value indicate that the access command is generated by trusted higher-level software.

11. The computer readable storage medium of claim 1, where the first device control instruction causes the processor to encode the data payload by setting a predetermined bit in the data payload to a second value indicate that the access command is generated by guest supervisor.

12. A method of managing a resource in a partitioned computer system, comprising:
generating a command for the resource;
retrieving a partition parameter from a first hardware register;
generating a storage address for a predetermined storage location at the resource;
encoding the command and the partition identifier into a data payload for storage to the predetermined storage location at the resource using the storage address; and
writing the data payload to the predetermined storage location using a memory-mapped secure store operation.

13. The method of claim 12, where the resource comprises an interrupt controller which receives and prioritizes partitioned interrupt requests from one or more interrupt sources to deliver a top priority interrupt to a processor.

14. The method of claim 12, where generating the storage address comprises retrieving the storage address from a dedicated address register.

15. The method of claim 14, where write access to either or both of the dedicated address register and the first hardware register is restricted to trusted higher-level software.

16. The method of claim 12, where the partitioned computer system comprises a processor and a partitioned resource, said processor executing a resource control instruction to perform a secure store operation of the data payload to the storage address at the partitioned resource comprising the command and a logical partition identifier (LPID), and said partitioned resource using the logical partition identifier (LPID) as a qualifier to determine if the command can be performed based on local access control information.

17. The method of claim 16, where the dedicated storage address and logical partition identifier (LPID) are managed by trusted software.

18. A data processing system comprising:
a partitioned interrupt controller; and
a processor coupled to the partitioned interrupt controller, wherein the processor executes an interrupt control instruction to encode a data payload with a command and a logical partition identifier (LPID) associated with a first interrupt request, and to perform a secure store operation of the data payload to a storage address at the partitioned resource using a memory-mapped secure store operation, where the storage address is retrieved from a dedicated address register at the processor.

* * * * *